United States Patent
Joachimsmeyer et al.

(10) Patent No.: US 9,157,478 B2
(45) Date of Patent: Oct. 13, 2015

(54) PLAIN BEARING

(71) Applicant: BROSE FAHRZEUGTEILE GMBH & CO. KOMMANDITGESELLSCHAFT, Wuerzburg (DE)

(72) Inventors: Dirk Joachimsmeyer, Hausen (DE); Zhiguo Wang, Munich (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 407 days.

(21) Appl. No.: 13/662,605

(22) Filed: Oct. 29, 2012

(65) Prior Publication Data

US 2013/0049506 A1 Feb. 28, 2013

Related U.S. Application Data

(63) Continuation of application No. PCT/EP2011/001128, filed on Mar. 8, 2011.

(30) Foreign Application Priority Data

Apr. 27, 2010 (DE) .................... 20 2010 006 089 U

(51) Int. Cl.
| | |
|---|---|
| H02K 7/08 | (2006.01) |
| F16C 17/12 | (2006.01) |
| F16C 33/24 | (2006.01) |
| F16C 17/26 | (2006.01) |

(52) U.S. Cl.
CPC ............... *F16C 33/24* (2013.01); *F16C 17/26* (2013.01); *F16C 2240/40* (2013.01); *F16C 2326/01* (2013.01); *F16C 2360/46* (2013.01); *F16C 2380/26* (2013.01)

(58) Field of Classification Search
None
See application file for complete search history.

(56) References Cited

U.S. PATENT DOCUMENTS

| 5,490,730 | A | 2/1996 | Akita et al. | |
|---|---|---|---|---|
| 8,449,192 | B2 | 5/2013 | Jiang | |
| 2006/0232153 | A1* | 10/2006 | Saito | 310/90 |
| 2007/0177833 | A1* | 8/2007 | Egami et al. | 384/279 |

FOREIGN PATENT DOCUMENTS

| CN | 1062342 C | 2/2001 |
|---|---|---|
| CN | 201383727 Y | 1/2010 |
| DE | 4400830 A1 | 12/1994 |
| JP | 8170646 A | 7/1996 |

OTHER PUBLICATIONS

International Search Report, dated Aug. 8, 2011.

* cited by examiner

*Primary Examiner* — Tran Nguyen
(74) *Attorney, Agent, or Firm* — Laurence A. Greenberg; Werner H. Stemer; Ralph E. Locher

(57) ABSTRACT

A plain bearing of a shaft, in particular of an electric-motor drive unit of a motor vehicle, contains a first plain bearing part that surrounds the shaft and a second plain bearing part connected axially to the first plain bearing part. The thermal expansion coefficient of the second plain bearing part is greater than the thermal expansion coefficient of the first plain bearing part.

9 Claims, 5 Drawing Sheets

PLAIN BEARING

CROSS-REFERENCE TO RELATED APPLICATION

This application is a continuation, under 35 U.S.C. §120, of copending international application No. PCT/EP2011/001128, filed Mar. 8, 2011, which designated the United States; this application also claims the priority, under 35 U.S.C. §119, of German patent application No. DE 20 2010 006 089.3, filed Apr. 27, 2010; the prior applications are herewith incorporated by reference in their entirety.

BACKGROUND OF THE INVENTION

Field of the Invention

The invention relates to a plain bearing of a shaft, in particular of an electromotive drive unit, for example for a window lifter or radiator fan of a motor vehicle.

While, in a rolling bearing, the parts moved in relation to one another are supported on one another via rolling bodies, for example balls, the two parts of a plain bearing which move in relation to one another are in direct contact and slide one on the other. The sliding friction thereby caused can be kept low by the suitable choice of a low-friction material pairing of the plain bearing and of the supporting shaft or by generating a lubricating film which separates the contact faces of the plain bearing and of the shaft from one another.

So as to keep a sufficiently large lubricant stock always available, plain bearings are often configured as sintered bearings in which the plain bearing is composed of a sintered material instead of a solid bearing material. Sintered bronze and sintered iron are customary here. The sintered metals are produced by pressing metal powder under high pressure. On account of the porosity of the sintered metals, which consequently have a specific pore fraction, there is the opportunity for stocking with some lubricant in that the pores of the sintered bearing are filled with the lubricant, for example oil.

However, a plain bearing of this type tends in a disadvantageous way to have undesirable running noises (creaking and/or rattling) at relatively low temperatures. This undesirable noise behavior is caused essentially by a lack of lubrication between the shaft and plain bearing. The reason for this is that the lubricating properties of the lubricant are increasingly lost at low temperatures.

SUMMARY OF THE INVENTION

The object on which the invention is based is to specify a plain bearing having a good noise behavior over a wide temperature range. In particular, the plain bearing is capable of being used with good running and noise properties even under confined construction space conditions, such as prevail in the case of electromotive actuating, auxiliary or fan drives in motor vehicles.

For this purpose, the plain bearing is composed of two plain bearing parts with different coefficients of thermal expansion (heat expansion coefficients). In this case, one of the plain bearing parts is completely or at least essentially metallic with a heat expansion coefficient in the range of between about $10 \times 10^{-6}$ 1/K and approximately $20 \times 10^{-6}$ 1/K, while the other plain bearing part has a heat expansion coefficient of between $50 \times 10^{-6}$ 1/K and about $150 \times 10^{-6}$ 1/K.

Suitable materials or substances for the first, metallic plain bearing part are, on the one hand, sintered iron and sintered bronze and, on the other hand steel, iron, bronze or brass. Suitable substances or materials for the second, plastic-like bearing part are preferably thermoplastics, such as polytetrafluoroethylene (PTFE), also known as TEFLON®, polyoxymethylene (POM) or polyvinylchloride (PVC). These plastics used may also be mixed with additives, in particular graphite, in order to increase the solid lubricating properties of the second plain bearing part. As a result, the sliding and lubricating properties of the plain bearing which are no longer present or are only insufficiently present at low temperatures are compensated.

The axial width of the two plain bearing parts is suitably different. In this case, the axial width of the first, metallic plain bearing part is expediently substantially greater than the axial width of the other, plastic-like plain bearing part. The latter is somewhat ring-shaped, as compared with the then cylindrical first plain bearing part. The plain bearing is therefore a combination of a supporting ring (supporting bush) composed of plastic with a metallic, in particular a cylindrical plain bearing part. The plain bearing part composed of plastic and resembling a supporting ring axially adjoins this metallic plain bearing part on the shaft preferably directly.

The outside diameter of the two plain bearing parts is expediently at least approximately identical. A suitable overall geometry of the plain bearing composed of the two plain bearing parts is thereby afforded. This makes it possible to have a simple and space-saving embedding of the plain bearing into a housing part, for example into a plastic gear case of an electromotive drive.

The described material pairing of the two plain bearing parts with different heat expansion coefficients provides a plain bearing which can be used with low noise over a wide temperature range of, for example, $-40°$ C. to $>100°$ C. In a temperature range of approximately or equal to $-20°$ C. up to, for example, $120°$ C., the first, metallic plain bearing part carries the shaft, whereas, below approximately or equal to $-20°$ C., the second plain bearing part, expediently configured as a plastic supporting ring, takes over the guidance of the shaft.

The advantages achieved by the invention are, in particular, that, by the combination of a suitably ring-like plain bearing part composed of plastic with a metallic, expediently cylindrical plain bearing part, no or only insignificant running noises occur, even at low temperatures, without the plain bearing according to the invention exhibiting the wear of a plastic bearing.

The reason for this is that the plastic-like supporting ring, as a second plain bearing, takes over shaft guidance only at low temperatures because of the comparatively high expansion coefficient and at the same time restricts the bearing play, whereas, at comparatively high temperatures, and in this case also even at room temperature, the shaft is guided solely by the first, metallic plain bearing. The second plain bearing part, composed of a thermoplastic suitably mixed with additives to increase the solid lubricating properties, fulfills a double function in this case at low temperatures, to be precise, on the one hand, the guidance and mounting of the shaft and, on the other hand, the lubrication of the plain bearing.

The plain bearing according to the invention is therefore suitable especially for mounting the shaft (armature, motor or gear shaft) of an electromotive drive unit of a motor vehicle, such as, for example, of a servodrive, of an actuating drive for a part to be moved between an open position and a closed position (vehicle window, tailgate, sliding roof or the like) or of a fan blower drive. On account of the small construction volume of the plain bearing according to the invention, this can be introduced simply and in a space-saving way into a suitable housing part of the drive unit, for example into a gear case. Moreover, the use of the combined plain bearing with a metallic and a plastic-like plain bearing part is more cost-effective than the use of a rolling bearing.

Since, as is known, operating time at low temperatures amounts to only a comparatively small fraction of the overall service life, a shorter service life of the plastic plain bearing part has a virtually insignificant effect, if at all. The plastic plain bearing part can therefore also be configured with a comparatively short axial width as a space-saving plastic supporting ring.

Other features which are considered as characteristic for the invention are set forth in the appended claims.

Although the invention is illustrated and described herein as embodied in a plain bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts corresponding to one another are given the same reference symbols in all the figures.

Figure 1:
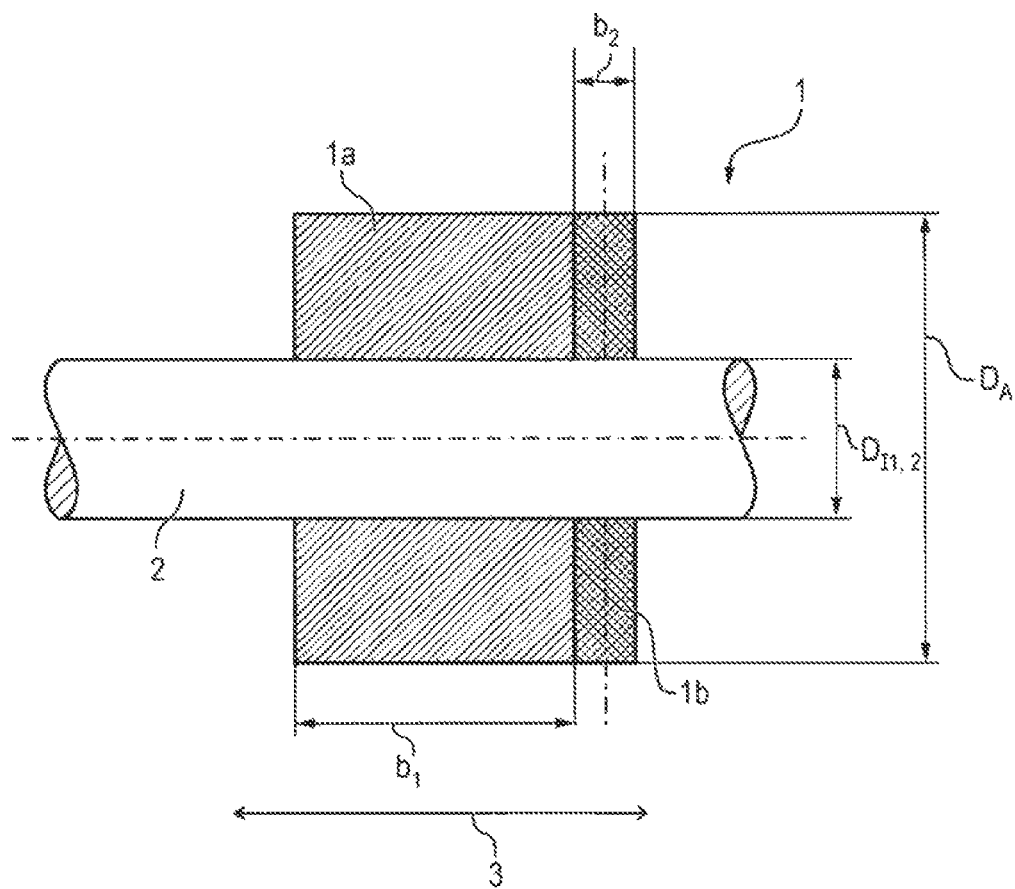
FIG. 1 is a diagrammatic, partially sectional view of a plain bearing composed of two plain bearing parts of different materials, together with a shaft guided by it according to the invention.

FIG. 1 shows in section a two-part plain bearing 1 with a first plain bearing part 1a and with a second plain bearing part 1b which respectively support and guide a shaft 2 (e.g. a driveshaft) indicated in perspective. The first plain bearing part 1a is cylindrical and has, in an axial direction 3, an axial width $b_1$ which is greater than the axial width $b_2$ of the second plain bearing part 1b. The ratio of the axial widths $b_1/b_2$ is, for example, about four. The first plain bearing part 1a is therefore cylindrical, while the second plain bearing part 1b is, in comparison with this, ring-shaped. The second plain bearing part 1b may also be bush-shaped. The two plain bearing parts 1a and 1b lie in this case one against the other preferably directly, that is to say virtually without any clearance (play-free). An outside diameter $D_A$ of the two plain bearing parts 1a and 1b is identical.

The two plain bearing parts 1a and 1b have different heat expansion coefficients $\alpha_1$ and $\alpha_2[K^{-1}]$. In this case, the heat expansion coefficient $\alpha_1$ of the first plain bearing part 1a is lower than the heat expansion coefficient $\alpha_2$. The inside diameter $D_{I1,2}$ consequently changes differently as a function of the temperature T[° C.]. The result of this is that the first plain bearing part 1a takes over the guidance and support of the shaft 2 in one specific temperature range $\Delta T_1$ and the second plain bearing part 1b takes over the guidance and support of the shaft in the other temperature range $\Delta T_2$.

Figure 2:
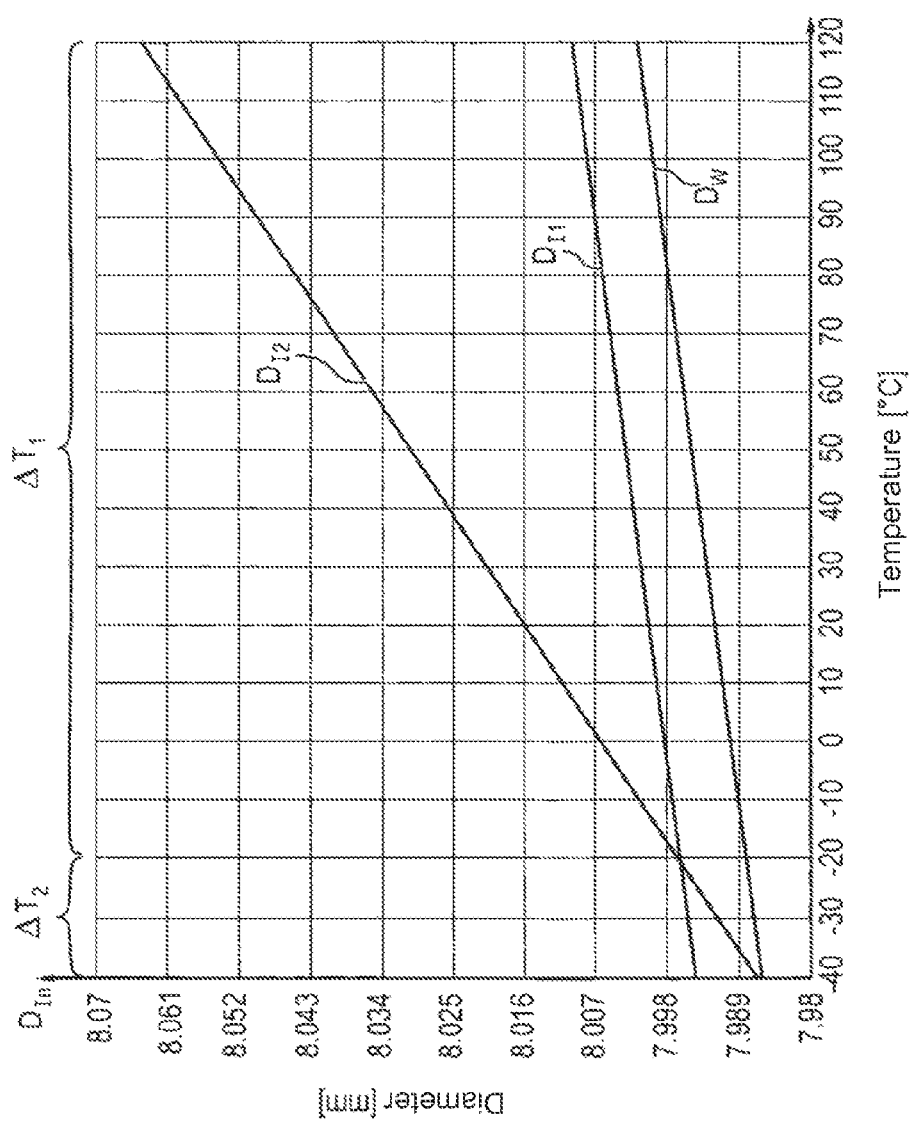
FIG. 2 is a graph showing a temperature-dependent diameter change of the bearing parts.

The temperature dependence of the inside diameter $D_{I1,2}$ is illustrated, in relation to the outside diameter $D_W$ of the shaft 2, in FIG. 2. It can be seen that, in the temperature range $\Delta T_2$ below approximately −20° C. (limit temperature with an at least approximately identical expansion coefficient $\alpha_{1,2}$ of the two plain bearing parts 1a and 1b), the inside diameter $D_{I2}$ of the second plain bearing part 1b is smaller than the inside diameter $D_{I2}$ of the first plain bearing part 1a as a result of the comparatively high expansion coefficient $\alpha_2$ of the former. The distance of the inner surface of the second plain bearing part 1b from the shaft surface therefore decreases to an increasing extent with a fall in temperature T, while the distance of the inner surface of the first plain bearing part 1a from the shaft surface increases with a falling temperature T.

In a temperature range $\Delta T_1$ above about −20° C. (limit temperature), the distance of the inner surface of the second plain bearing part 1b from the shaft surface increases with a rising temperature T, while the distance of the inner surface of the first plain bearing part 1a from the shaft surface decreases with a rising temperature T, so that the first plain bearing part 1a automatically takes over the guidance of the shaft 2 at the comparatively higher temperatures T.

Figure 3:
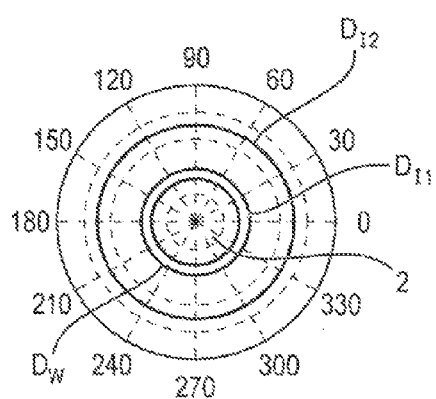
FIGS. 3 to 8 are illustrations of simulated diameter conditions of the various bearing parts at different temperatures.
Figure 4:
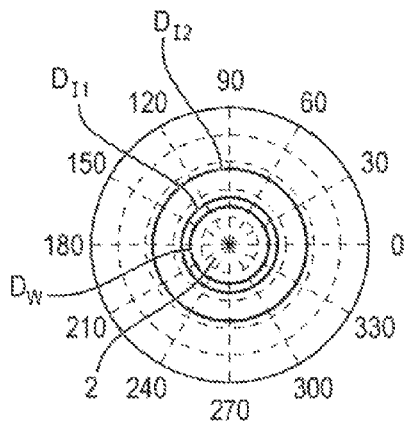
Figure 5:
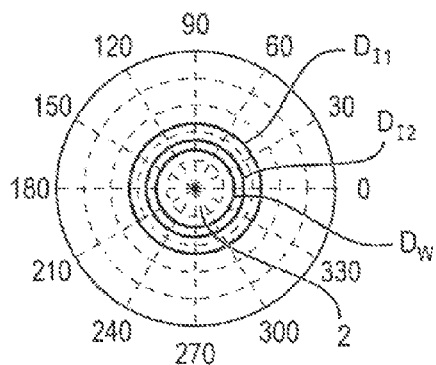
Figure 6:
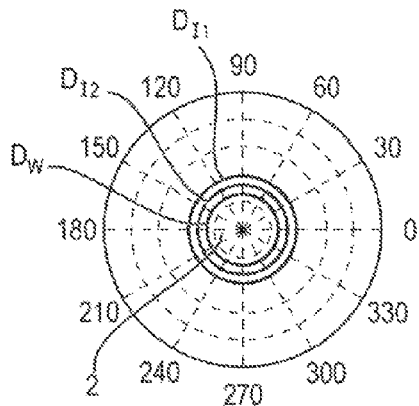
Figure 7:
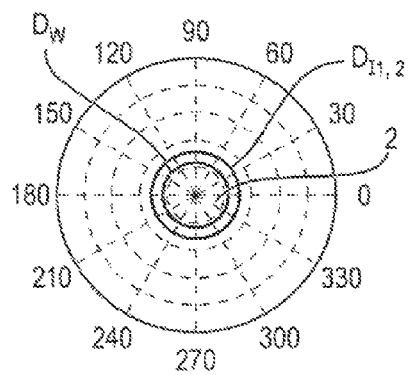

The temperature-dependent variation in the inside diameters $D_{I1,2}$ of the two plain bearing parts 1a and 1b in relation to the shaft 2 is simulated in FIGS. 3 to 8 at different temperatures T. Thus, FIG. 3 shows the conditions at a temperature of T=80° C. It can be seen that the inside diameter $D_{I2}$ of the second plain bearing part 1b is larger than the inside diameter $D_{I1}$ of the first plain bearing part 1a with a comparatively low expansion coefficient $\alpha_2$. At this temperature T=80° C., the first plain bearing part 1a therefore guides the shaft 2.

With a decrease in temperature T, the inside diameter $D_{I2}$ of the second plain bearing part 1b is reduced because of a comparatively high expansion coefficient $\alpha_2$ of the latter. This is made clear on the basis of the simulated illustration according to FIG. 3, by the illustration according to FIG. 4 for a temperature of T=40° C., the illustration according to FIG. 5 for a temperature of T=20° C. (room temperature) and according to FIG. 6 for a temperature of T=0° C., up to the simulated illustration, shown in FIG. 7, for a temperature of T=−20° C. At this virtual limit temperature T=−20° C., the inside diameters $D_{I1}$ and $D_{I2}$ of the two plain bearing parts 1a and 1b are at least approximately identical, so that both plain bearing parts 1a, 1b guide the shaft 2 virtually together.

Figure 8:
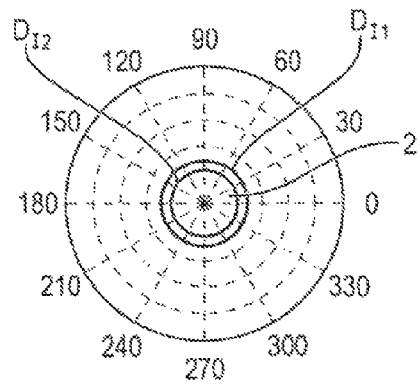

In the simulated graph illustrated in FIG. 8, which makes clear the conditions at a temperature of T=−40° C., the conditions have been reversed, so that, in this temperature range $\Delta T_2$, the inside diameter $D_{I1}$ of the first plain bearing part 1a is larger than the inside diameter $D_{I2}$ of the second plain bearing part 1b. The latter therefore takes over the guidance of the shaft 2 in this temperature range $\Delta T_2$.

A preferred material for the first plain bearing part 1a is sintered iron (12 to $13 \times 10^{-6}$ $K^{-1}$) or sintered bronze ($\alpha_1 = 18 \times 10^{-6}$ $K^{-1}$). This allows comparatively good lubrication on account of good storage and stocking of a lubricant, for example lubricating oil, as a result of the porosity of the sintered materials.

However, the material of the first plain bearing part 1a may also be iron or steel ($\alpha_1 = 12$ to $13 \times 10^{-6}$ $K^{-1}$). Alternatively, bronze or brass ($\alpha_1 = 17.5$ to $18.4 \times 10^{-6}$ $K^{-1}$) may also be used alternatively as material for the first plain bearing part 1a.

The second plain bearing part 1b is suitably composed of PTFE ($\alpha_2 = 100 \times 10^{-6}$ $K^{-1}$), known as TEFLON®. POM ($\alpha_2$=110×10$^{-6}$ K$^{-1}$) or PVC ($\alpha_2$=50×10$^{-6}$ K$^{-1}$) has emerged as a further suitable thermoplastic material. The plastic used for the second plain bearing part 1b is preferably mixed with graphite or another suitable additive to increase the lubricating properties of the plain bearing 1 even at low temperatures T. In addition to the higher heat expansion coefficient $\alpha_2$ in comparison with the material of the first plain bearing part 1a, the material used for the second plain bearing part 1b therefore has good slidability, resistance and producibility and also high rigidity and strength.

Figure 9:
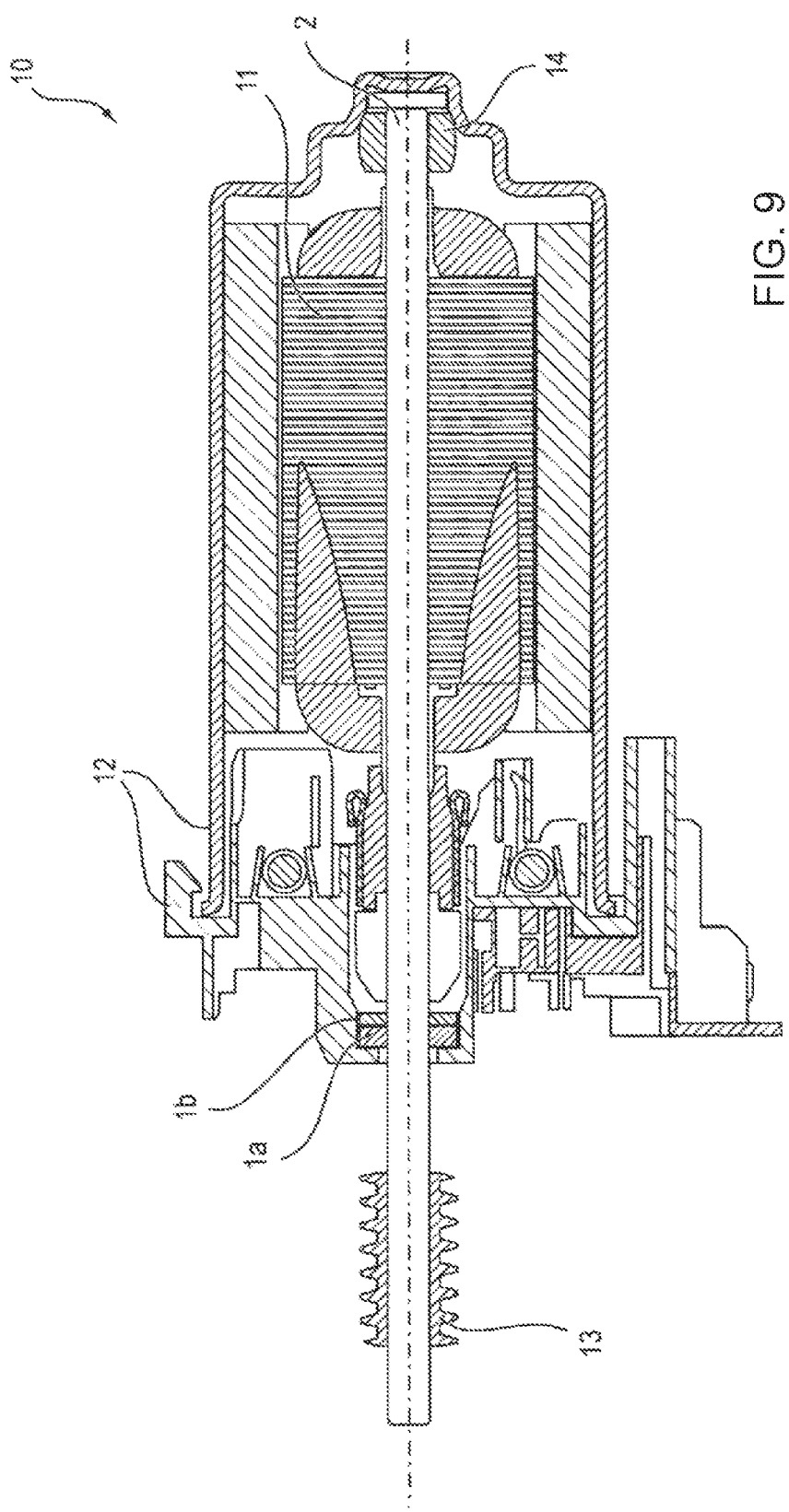
FIG. 9 is a sectional view of the plain bearing according to FIG. 1 installed in an electromotive actuating drive.

FIG. 9 shows, as an example of the use of the two-part plain bearing 1 according to the invention, a drive unit (for example, window lifter) 10 with an electric motor 11 with its driveshaft 2 within a housing 12. The driveshaft 2 has on the gear side a worm 13 which meshes in a way not illustrated in any more detail with a worm wheel of a worm gear which is coupled to an actuating element, not illustrated, for example to a window pane, of a motor vehicle.

The plain bearing 1 according to the invention with the two plain bearing parts 1a and 1b is embedded, in this exemplary embodiment in the region between the electric motor 11 and worm gear 13, into the housing 12 and guides (supports) the shaft 2 there. The driveshaft 2 is mounted on the motor side in a spherical bearing 14. Instead of the spherical bearing 14, however, the plain bearing 1 according to the invention may likewise be used.

Figure 10:
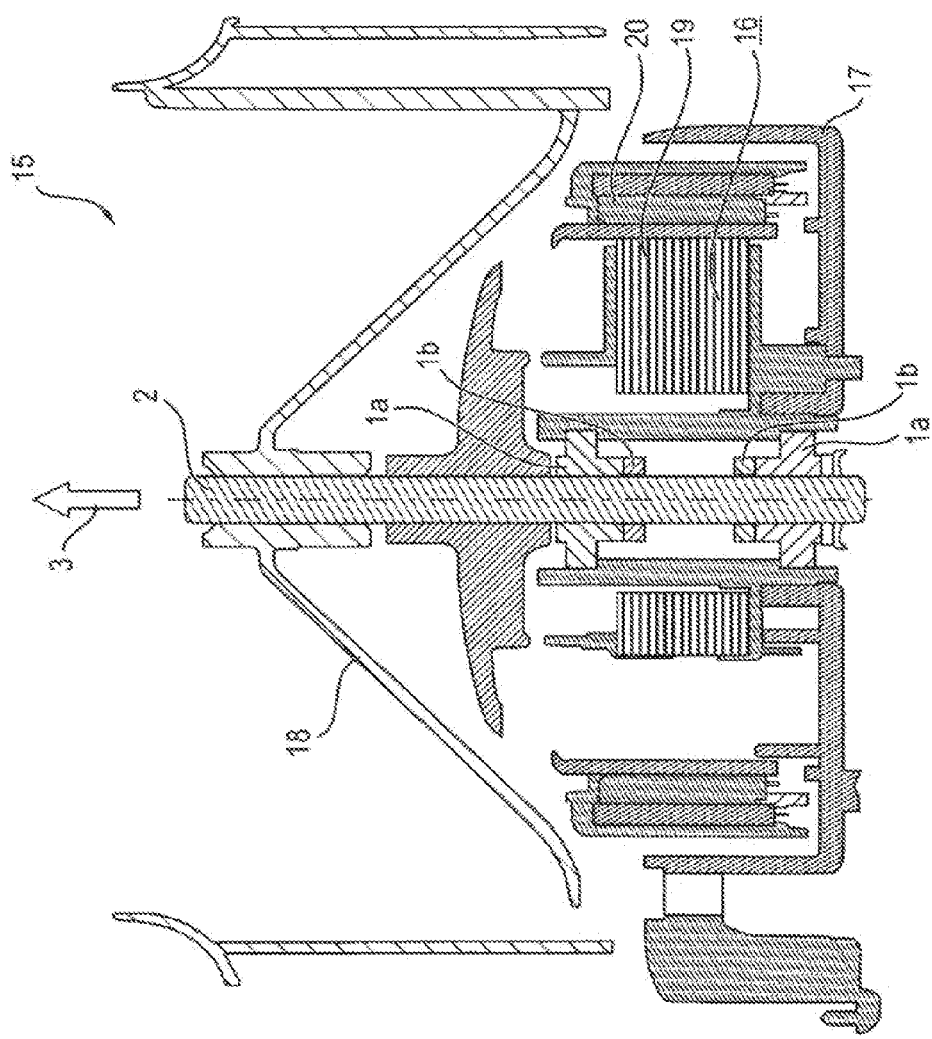
FIG. 10 is a sectional view of a fan lower drive with two plain bearings according to FIG. 1 guiding the fan wheel driveshaft.

FIG. 10 shows a further example of the use of the two-part plain bearing 1 according to the invention in a fan blower drive (electromotive radiator fan) 15 with an electric motor 16, the driveshaft 2 of which is mounted within a housing 17 in two plain bearings 1, each with the first plain bearing part 1a and with the second plain bearing part 1b. The driveshaft 2 is coupled to a fan wheel 18. The electric motor 16 is configured as an external rotor motor with a central stator 19 and with a rotor 20 rotating around the latter.

The invention claimed is:

1. An electromotive drive unit of a motor vehicle, comprising:
   a housing;
   a shaft piercing said housing;
   a plain bearing for supporting said shaft and embedded in said housing, said plain bearing having a first plain bearing part surrounding said shaft, a second plain bearing part adjoining said first plain bearing part axially having a heat expansion coefficient being higher than a heat expansion coefficient of said first plain bearing part;
   said first plain bearing part having said heat expansion coefficient of between 10·10$^{-6}$ (1/K) and 20·10$^{-6}$ (1/K), and said second plain bearing part having said heat expansion coefficient being ≥50·10$^{-6}$ (1/K);
   said first plain bearing part composed of a metallic material and said second plain bearing part is composed of a plastic material; and
   a guidance of said shaft taking place in said first plain bearing part in a temperature range above approximately or equal to −20° C. and in said second plain bearing part in a temperature range below approximately or equal to −20° C.

2. The electromotive drive unit according to claim 1, wherein the electromotive drive unit is selected from the group consisting of a fan blower drive and an actuating drive for an actuating element.

3. The electromotive drive unit according to claim 1, wherein said heat expansion coefficient of said second plain bearing part being in a range of 50·10$^{-6}$ (1/K) and 150·10$^{-6}$ (1/K).

4. The electromotive drive unit according to claim 1, wherein said second plain bearing part adjoins said first plain bearing part axially without a gap there-between.

5. The electromotive drive unit according to claim 1, wherein an axial width of said first plain bearing part is greater than an axial width of said second plain bearing part.

6. The electromotive drive unit according to claim 1, wherein an outside diameter of said first and the second plain bearing parts is at least approximately identical.

7. The electromotive drive unit according to claim 1, wherein said first plain bearing part is composed of a sintered metal.

8. The electromotive drive unit according to claim 1, wherein said second plain bearing part is composed of a thermoplastic.

9. The plain bearing according to claim 1, wherein said second plain bearing part is composed of polytetrafluoroethylene.

* * * * *